United States Patent [19]

Schoon

[11] Patent Number: 4,686,363
[45] Date of Patent: Aug. 11, 1987

[54] SELF-RESONANT SCANNER BIASING SYSTEM

[75] Inventor: David J. Schoon, St. Paul, Minn.

[73] Assignee: Printware, Inc., Mendota Heights, Minn.

[21] Appl. No.: 820,231

[22] Filed: Jan. 21, 1986

[51] Int. Cl.⁴ .............................................. H04N 3/08
[52] U.S. Cl. .................................. 250/235; 358/208; 358/293
[58] Field of Search .................. 250/201 R, 234–236; 346/108; 350/6.5, 6.6; 358/208, 285, 293

[56] References Cited

U.S. PATENT DOCUMENTS

| | | | |
|---|---|---|---|
| 4,204,233 | 5/1980 | Swager | 358/293 |
| 4,400,740 | 8/1983 | Traino et al. | 358/285 |
| 4,541,061 | 9/1985 | Schoon | 350/6.5 |
| 4,571,623 | 2/1986 | Schoon | 358/208 |
| 4,587,531 | 5/1986 | Dangler | 346/108 |

Primary Examiner—Edward P. Westin
Attorney, Agent, or Firm—William C. Fuess

[57] ABSTRACT

Integrations of the historical numbers of times that a light beam scanned in an oscillatory course by a self-resonant galvanometer scanner does traverse so far in a first direction so as to impinge upon a Beginning-of-Trace (BOT) sensor, and does traverse so far in the opposite direction so as to impinge upon an End-of-Trace (EOT) sensor, are each used to separately control the voltage level developed in a first, BOT, electrical tank circuit and in a second, EOT, electrical tank circuit. Voltage from each tank circuit is amplified and applied to drive the self-resonant scanner, at a polarity to induce continued oscillation, during one-half of each oscillatory cycle. Amplitude and centering control thereby obtained of the sinusoidal oscillation of the self-resonant scanner is repeatable to better than one part in ten thousand between cycles.

10 Claims, 14 Drawing Figures

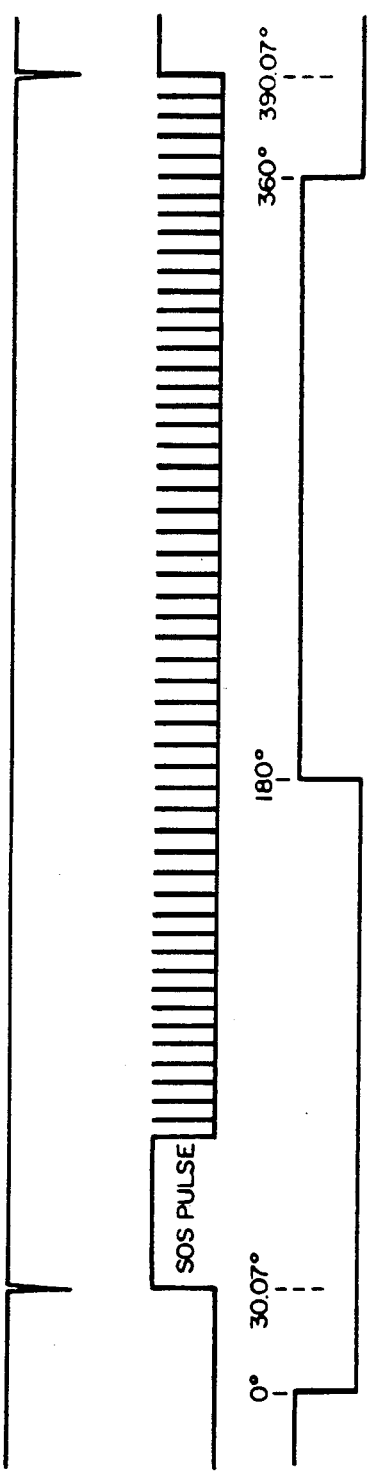

SELF-RESONANT SCANNER BIASING SYSTEM

BACKGROUND OF THE INVENTION

1. Field of the Invention

The present invention relates to a scanning system for an information displaying recorder, for example a printer, which utilizes a light beam, for example a laser light beam. More particularly, the present invention is a circuit for the control of a self-resonant galvanometer to which is affixed a mirror for scanning a light, or laser, beam in order that both the amplitude and the centering of a such a scanned light, or laser, beam deflected by such self-resonant galvanometer may be fixed and maintained most precisely.

2. Description of the Prior Art

An essential part of any information displaying recorder which utilizes a swept light beam, or non-impact printer, is the scanning system. The scanning system sweeps the light beam, nominally a laser beam such as is derived from a helium-neon laser or a laser diode, across a photo conductive target, nominally either a photo conductive drum or photo conductive paper. Diverse ways of scanning a light beam exist. These include a polygonal mirror and motor, a holographic disc and motor, a linear galvanometer and mirror, and a self-resonant galvanometer scanner. A survey of these diverse methods is contained in the article "Laser Scanning and Recording: Developments and Trends" occurring in LASER FOCUS/ELECTRO-OPTICS for February 1985 at pages 88-96.

In all cases of scanning with a light, or laser, beam in order to print or display information, data is used to turn the laser beam on and off in accordance with the presumed position of the scanning beam. In order to obtain the best possible appearance of the characters, it is essential that the presumed beam position and the actual beam position should agree as closely as possible. Otherwise, irregularities in the characters will occur, such as lines intended to be vertical appearing jagged. For motor-driven scanners, such as those employing a polygonal mirror or a holographic disc, one of the difficulties encountered is that the motors may speed up or slow down slightly, causing irregularities in the information displayed or printed.

For self-resonant galvanometer scanners, the control of which is the subject of the present invention, the amplitude of the oscillation and/or the center of the scan position may "hunt" up and down. This causes irregularities in pixel location resulting from error in the presumed position of the mirror of such self-resonant galvanometer scanner, and the resultant deflection of the light beam which would occur from such presumed mirror position. This imperfect repeatability, or "hunting", of a self-resonant galvanometer scanner results from the minute differentials of force operating on its delicate suspension system; a combination of magnetomechanical and electronic driver system imbalances.

Accompanying the diverse types of light deflecting, or laser beam, scanning systems within information displaying recorders, or laser printers, is existing technology directed toward minimizing errors. For example, in motor-driven scanners, precision or even air bearings are used to minimize velocity variation. However, as some errors still occur, a second laser beam from that first laser beam used for image projection, or printing, purposes is sometimes used. This second laser beam is projected onto a grating in order to generate a set of clock signals which, when detected, indicate the rate of travel of the mirror system.

More pertinent to the present invention are the prior art means for the control of the amplitude and the centering of the scanning mirror, and resultant scanned light beam, of the self-resonant galvanometer system. A general discussion of the prior art for control of self-resonant scanners is contained in the article, "Linearizing Resonant Scanners", appearing in the magazine LASERS AND APPLICATIONS for August 1985 at pages 65-69. Although primarily concerned with the problem of synchronizing a sinusoidal scanner velocity to external drive electronics, and the generation of fixed clocks such as will strobe data onto a laser beam being sinusoidally scanned, mention is made in this article of the severe problems of repeatability in beam scanning wherein phase delay and associated drift rates cause registry errors in the printed information.

The most straight-forward, and simplest, implementation of a self-resonant scanner linearization scene is an analog clock. However, the analog clocking of fixed data onto a sinusoidally variant light beam resultant from a self-resonant scanner suffers from poor performance characteristics stemming from thermal drift, resolution limits, and maximum pixel and scanning frequencies. A teaching of this method is contained in U.S. Pat. No. 3,978,281 to G. J. Burrer. An alternative linearization technique for self-resonant galvanometer scanners is to employ a grating technique like to that employed for rotating polygon scanners. An example of this scheme is taught in U.S. Pat. No. 4,212,018 to Ohnishi et al. Two methods of linearization are also discussed in the "Linearizing Resonant Scanners" article. These methods use beam positional sensors called Start-of-Scan (SOS) and End-of-Scan (EOS) sensors, which sensors, like as to sensors within the present invention, will sense the position of the scanned light beam. Resultant to this sensing, there is a feedback system implemented for control of the self-resonant galvanometer scanner. In particular, the scanner amplitude will be determined by comparing a previously stored value with the number of master clock cycles which have occurred between consecutive passages of the oscillatory light beam over the SOS sensor. The result of this comparison, performed in a microprocessor, is converted into a voltage by a digital-to-analog converter, with the output of such converter driving a sample and hold circuit. The value stored within such sample and hold circuit represents the amplitude error of the scanner, and is summed with the integral of the amplitude error and used to drive the automatic gain control input of an analog controller powering the self-resonant galvanometer scanner. In this manner, the amplitude of the scanner is attempted to be held to a variation which is a fraction of a pixel interval, and the operating angle is attempted to be held constant because the master oscillator will be phase- and frequency-locked to the scanner.

As a second digital variant of this linearization scheme, the count can be formed as the difference between an initial count occurring upon the passage of the beam over the SOS detector (representing the beginning of the image area) and the final count occurring at the time of passage of the beam over the EOS detector. The micro-processor will again use the time of occurrence information to generate corrections to scanner drift as occurred during the previous line-scan interval. The corrections are applied to set latches, which resultantly are interpreted by a digital-to-analog converter to provide fine tuning adjustment to the Voltage Controlled Output (VCO) master oscillator. The amplified output of such master oscillator is used to energize the drive of the self-resonant galvanometer.

Both prior art digital methods allow for correction of amplitude and frequency drifts in the self-resonant galvanometer scanner, eliminating the need for sophisticated analog phase-locked control units. But a limitation is that the fastest element in the hardware runs at the pixel clock rate. This pixel clock runs at very high frequencies, often upwards of 150 MHz. For example, an application calling for 20,000 pixels placed with an accuracy of 1 part in 200,000 (tolerable absolute non-cumulative pixel-placement error of 10 percent or less of the pixel-to-pixel spacing is nominal) using 80 percent of the scan angle with a scanner running at 200 Hz needs a master clock frequency of approximately 136 MHz. Such high pixel clocking rates are difficult to obtain with transistor-transistor logic, which is most reliable in the range below 50 MHz. An additional problem with the prior art schemes is that the stability and repeatability required of the analog voltage control oscillator and the associated driving digital/analog converters is very great. As previously stated, the minute differentials of force, which may occur from single scan to single scan, operating on the delicate suspension system of a self-resonant galvanometer scanner, combined with electronic driver system imbalances, produces repeatability inaccuracies in even the digital prior art methods for control of a self-resonant galvanometer scanner.

Still a further prior art scheme of clocking data to a laser diode, or other light modulation means, in a printer which uses a self-resonant galvanometer mirror is taught in U.S. Pat. No. 4,541,061 for Data Clocking Circuitry to the selfsame inventor of the present invention. A Start of Scan (SOS) signal from a photodiode signals when an exact position short of the leading edge of the image area (the paper) is reached. This signal resets a counter and enables a Voltage Controlled Oscillator (VCO) to start oscillating. This output goes to a counter which, in turn, supplies the data address for a memory. This memory contains the data which is converted to analog to control the speed of the VCO. This method supports speed corrections over the duration of the scan, but does not deal with establishing precise repeatability from scan to scan as is dealt with by the present invention.

SUMMARY OF THE INVENTION

The present invention is a circuit for the control of the scanning system of an information displaying recorder, or non-impact printer, which recorder uses a light beam, which may be a laser light beam. More particularly, the circuit of the present invention is for the control of the amplitude and centering of a laser beam scanned in spacial position by reflection from an oscillating mirror affixed to a self-resonant galvanometer. It is important that the trajectory of a deflected light, or laser, beam should be as predictable as possible, and that the amplitude and centering of such scanned light, or laser, beam should be fixed most precisely, in order that fixed characters written or detected with such beam may be spacially fixed in position most precisely.

In the preferred embodiment of the invention, two photo sensors are used which precisely demark, when the circuit of the present invention is active, the opposite ends of the desired laser beam sweep. The first such photo sensor is called the Start-of-Trace (SOT) sensor, and the second such photo sensor is called End-of-Trace (EOT) sensor. The entire path of a light, or laser, beam scanned in an oscillatory, sinusoidal, pattern responsively to a self-resonant scanning mirror will be controlled by the circuit of the present invention to lie precisely between these two sensors, intermittently and interspersedly impinging upon each one if the path of the scanned light beam is sufficiently lengthy in that direction, or intermittently failing to impinge upon each sensor if the path of the light beam does not traverse so far as the sensor in that direction of excursion. The SOT and the EOT sensor thusly each demark a very precise point, and the light beam which is scanned between them will be expected intermixedly both to traverse so far so as to contact, or to fail to contact, these points during actual system use; the goal always being to control the oscillation of the self-resonant scanner so that the light beam is deflected precisely from the SOT point to the EOT point, with the center point of the scan being midway between such SOT and EOT points.

The manner by which the circuit of the present invention will control a self-resonant galvanometer in order that a scanning mirror affixed thereto may deflect a light, or laser, beam repetitively precisely from a first, Beginning-of-Trace, point to a second, End-of-Trace, point is by keeping a historical record, or accumulation, of the times as the light beam does impinge upon each such point, and using each such record to independently adjust the amplitude of each of a respective first one-half (the positive) and second one-half (the negative) scanner drive signal as is applied to the self-resonant galvanometer scanner respectively during each of the two halves of each scan cycle. Particularly, the Start-of-Trace (SOT) sensor does detect those times wherein the light beam deflected responsive to a self-resonant galvanometer scanner does traverse so far in a first direction of excursion so as to impinge upon the Start-of-Trace point. These SOT detections are accumulated. Particularly, a preferred type of historical accumulation is taken: an integrated accumulation over time, or simply integration. This integration is performed in first, Start-of-Trace, integrating means which produces a first voltage level proportional to the integrated numbers of times that the light beam did traverse so far in such first direction of excursion so as to impinge upon the Start-of-Trace sensor.

The preferred operation of the present invention for integration of sensor detections over time, as opposed to mere accumulation over time, means that although the historical information regarding the times that the light beam did impinge upon the sensor could have been weighted equally (i.e., merely accumulated), the integration will instead make that the most recent times of occurrences will be weighted proportionately more heavily in producing the control voltage level than more ancient times of occurrences. Further, the time constant of the integration is selectably predeterminable, being in particular fixed by the time of execution of a microinstruction loop. The time constant of the first, Start-of-Trace, integration is preferably predetermined to be long relative to any one oscillatory cycle of the light beam, and long relative to the corresponding occurrences of impinging, or failing to impinge, upon the Start-of-Trace sensor. The selectable predetermination of the integration time constant is useful in optimizing the control of various types of self-resonant galvanometers of varying electomechanical response, and even in optimizing the control of an individual self-resonant galvanometer.

The preferred actual manner of the integration is by the analog development of a variable first, analog, voltage in an electrical tank circuit. The voltage maintained in the electrical tank circuit is caused to be slightly increased (i.e., it is varied) in positive magnitude upon each oscillatory cycle wherein the Start-of-Trace sensor does not detect the impingement of the light beam, and to be slightly decreased in positive magnitude upon each oscillatory cycle wherein the Start-of-Trace sensor does detect the impingement of the light beam.

Finally, the variable first voltage level produced by the first, Start-of-Trace, integrating means (responsively to integration of the historical detections by the Start-of-Trace sensor that the light beam has, or has not, traversed so far in a first direction so as to impinge upon the sensor) is coupled during a first one-half of the oscillatory cycle to the self-resonant galvanometer driver at a polarity which will cause such self-resonant scanner of a light beam to continue in oscillation, and at an amplitude which will cause that the light beam should traverse so far in the first direction as precisely the Start-of-Trace point. In such a manner cycle-to-cycle variations, or "hunting", of the self-resonant galvanometer scanner are minimized while a feedback scheme responsive to tightly control the position (in the first, Start-of-Trace, direction) of the light beam deflected by such self-resonant scanner is obtained.

In a like manner, the End-of-Trace (EOT) sensor does detect whether the light beam has traversed so far in the second direction of excursion, opposite to the first direction of excursion, so as to impinge upon such sensor at the End-of-Trace point. The results of successive, historical, such occurrences of impinging, or failing to impinge, upon the EOT point are integrated in second, End-of-Trace, integrating means to produce a second variable voltage level which is proportional to the numbers of times which such light beam has (historically) traversed so far in the second, EOT, direction of excursion so as to impinge upon the EOT point. Further, by action of such integration, the more recent times of occurrences are weighted more heavily in such integration to produce the second voltage level than are the more ancient times of occurrences. The integration is at a selectably predeterminable time constant, which is preferably long relative to any one oscillatory cycle of the light beam. The second voltage level is produced in a second electrical tank circuit, incrementing and decrementing the positive voltage magnitude of such second electrical tank circuit respectively responsively responsively to whether the End-of-Trace sensor has not, or has, detected the impingement of the oscillatory light beam. Finally, the second voltage level resultant from the second, End-of-Trace, integrating means is coupled to the self-resonant scanner of a light beam at a polarity causing such to continue in oscillation, and at that magnitude which will induce that the light beam should be deflected in the second direction precisely so far as the EOT point.

By the operation of the circuit of the present invention, the excursion of a light beam in a first, Beginning-of-Trace, direction and in a second, End-of-Trace, direction is detected in sensors, is integrated over time in integrating accumulators, and is used to respectively adjust the positive (first direction) and negative (second direction) scanner drive amplitudes in an independent manner. Thus a direct current bias is imparted to the scanner drive signal which will correct for such minor centering errors as either exist, or come to exist due to magneto-mechanical and/or electronic driver system variations occurring during operation.

Although the function and implementation of the preferred embodiment of the invention is thusly straight-forward and readily understood, the organizing principles of the present invention which would accord for alternative implementations are more subtle. In the first instance, it may be noted that the operation of the circuit of the invention to, responsive to the Start-of-Trace sensor detections, control the drive of the self-resonant scanner of a light beam in the direction of such Start-of-Trace sensor is independent of that control, responsive to the End-of-Trace sensor, for the drive of a self-resonant scanner of a light beam in the direction of such End-of-Trace sensor. The present invention would be operative, although with less effectiveness and efficiency, if it was implemented but by halves to control either the drive of the self-resonant scanner of a light beam only in a first direction, or the drive of the self-resonant scanner of a light beam only in a second direction.

A further organizing principle of the present invention not immediately apparent from the preferred embodiment implementation is that the times of occurrences that an oscillatory light beam driven by a self-resonant scanner does impinge upon a Start-of-Trace sensor, and End-of-Trace sensor, could have merely been accumulated, as by a digital counter or analog integrator, over some historical interval and thereafter used to proportionately generate a drive current. This method of linear accumulation may be less effective than the preferred method and embodiment of the present invention to integrate the times of occurrences making that recent times of occurrences are weighted proportionately more heavily than more ancient times of occurrences in producing the appropriate level of drive current to be applied.

Furthermore, even when integration is recognized to be superior to accumulation, the integration could have been performed digitally, or over but a fixed time period, as opposed to the preferred embodiment implementation wherein the integration is over the entire time period since power is applied to the system. In other words, when true integration is performed as in the preferred embodiment of the present invention then even the most ancient occurrences that a light beam, tracing an oscillatory course responsive to a self-resonant scanner of such light beam, did impinge upon a Start-of-Trace sensor, or an End-of-Trace sensor, are preserved (although with increasingly less weighting as the event becomes more ancient) toward the production of the correct drive to be applied to the self-resonant scanner of such light beam.

Further concerning the organizing principle of integration evidenced in the preferred embodiment of the present invention, it should be realized that the energy which is integrated over time proportionately to the numbers of detections could have been that energy detected by the Start-of-Trace sensor, or by the End-of-Trace sensor, themselves (suitably amplified) as opposed to the actual preferred embodiment integration (proportionately to the numbers of detections) of the energy of a power supply. This preferred integration of the present invention is solely dependent upon whether an oscillatory light beam is detected to impinge upon such Start-of-Trace sensor or such End-of-Trace sensor; meaning the numbers and times of occurrences of such detections and not upon the sensor detected energy attendant upon each or of any of such detections. It is preferred that the energy of the power supply, as opposed to the energy of sensors (suitably amplified), should be integrated because of variations in sensor energy as may occur due to sensor sensitivity variations, occulting dust, aging, extraneous impinging light, light source intensity variations, or other factors.

Finally, and moreover, the integration performed by the preferred embodiment of the present invention should be understood to be a combination of a hardware and software transfer functions. The hardware components, consisting of operational amplifiers and storage capacitors, which do independently accumulate, proportionately to the detections of the Start-of-Trace sensor and the End-of-Trace sensor, the energy of the power supply, are obviously and fixedly involved in the integrating function. The software, or microcode, which in the operation of the preferred embodiment of the present invention does also control the time period of the integration is also involved, in this case in a controllably predetermined manner, in the net integration function. The net integration function is thusly controllable by alteration of software, or microcode, to be adjusted in a highly sophisticated manner.

By the sophisticated integration of the present invention, the extreme difficulties of highly sensitive frequency and phase control of a self-resonant light scanner of a light beam may be overcome. The present invention will maintain the phase relationship between a mirror affixed to a self-resonant scanner and to the inductive drive coil of such scanner in a manner which is highly noise insensitive. The length of scan, and the positional precision with time, of an oscillatory light beam scanned by a self-resonant scanner will be established by the circuit of the present invention to occur with extreme repeatability and precision. This extreme repeatability and precision is, as before mentioned, necessary if data is to be impressed (or extracted) (in a non-linear manner) upon the oscillatory light beam for the purposes of scanning or printing of an image. The repeatability and precision in the drive control of a self-resonant scanner of a light beam established by the circuit of the present invention will permit, when coupled with a system for impressing in non-linear-time data upon an oscillatory light beam (which system is not the subject of the present specification disclosure) a positional resolution greater than 1200 dots per inch along the direction of the scan of such light beam over a distance, or image area, of greater than 8.5 inches. It might thusly be calculated that the control circuit of the present invention is maintaining the positional stability of a light beam scanned in an oscillatory manner by a self-resonant galvanometer to which is attached a scanning mirror with an accuracy and repeatability of better than one part in ten thousand. This accuracy and repeatability applies to both the spacial position of such beam, and to the repeated, cyclic, times at which such spacial position will be reached by such beam.

BRIEF DESCRIPTION OF THE DRAWINGS

FIG. 6, consisting of FIG. 6A through FIG. 6D, shows the wave forms of certain signals which are used in timing of the circuit of the present invention shown in FIG. 5.

FIG. 7, consisting of FIG. 7A and FIG. 7B, shows wave forms which will illustrate possible variance occurring in one timing signal applied to the circuit of the present invention, in conjunction with the discussion of which variance it will be shown that the performance of the circuit of the present invention will be substantially unimpaired for producing desired functionality.

DESCRIPTION OF THE PREFERRED EMBODIMENT

Figure 1A:
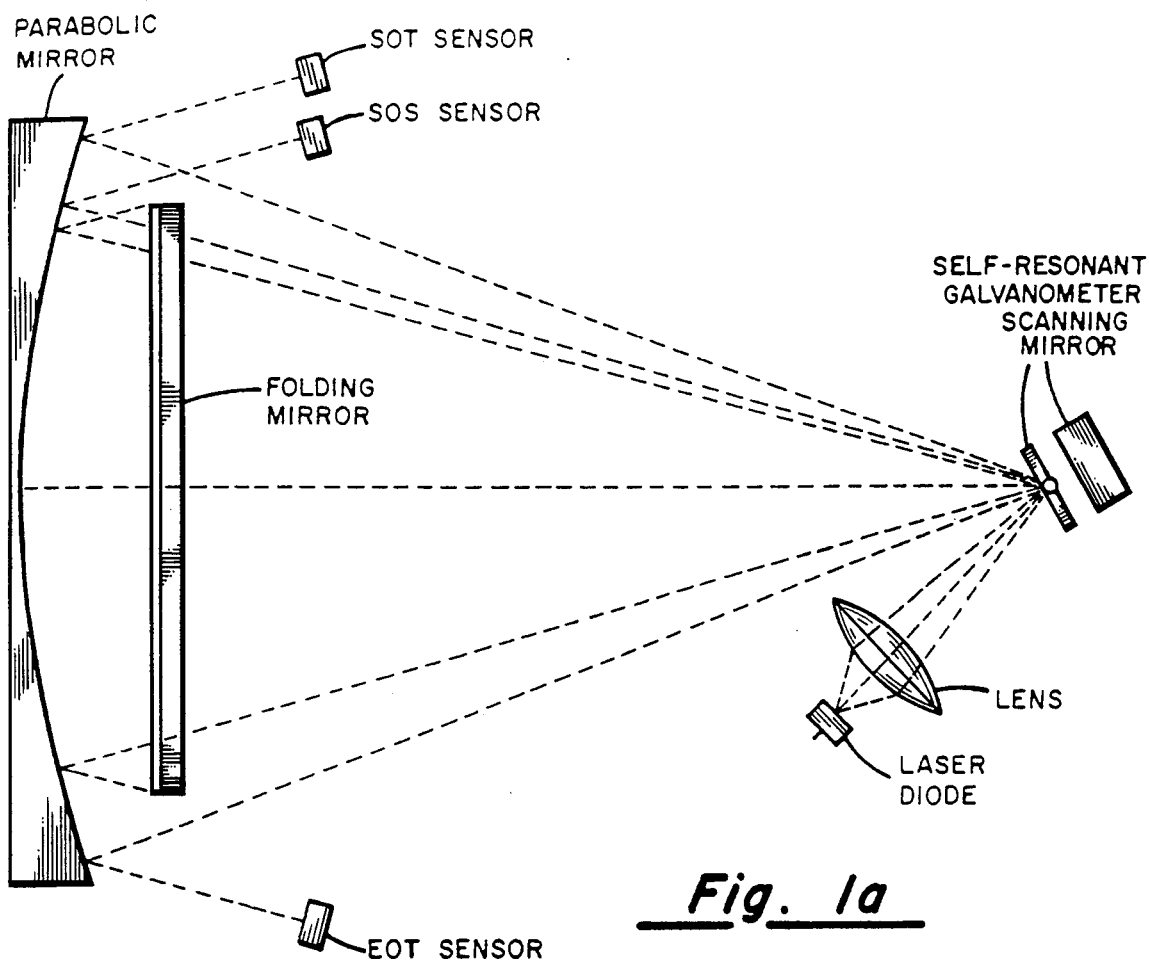
FIG. 1, consisting of FIG. 1A and FIG. 1B, shows in orthogonal views the optical layout which would be used in a non-impact information recording device, or printer, employing a self-resonant galvanometer scanner.

The present invention is a circuit for the control of a self-resonant galvanometer to which is attached a mirror, making thereby an optical scanning system which may deflect a light beam, normally a laser light beam, in a raster pattern across a media, such as a photo conductive drum, in order that non-impact display of imagery, or printing, may be performed. It is important that the light, or laser, beam should be scanned accurately in space and in time in order that imperfections, or errors—which errors are resultant from modulating, the light, or laser, beam on and off in the face of imperfect, or inaccurate, knowledge as to the precise position of the light, or laser beam—should be minimized. All the aspects of light, or laser, scanning including non-impact printing, color imaging, digitizing, marking, hole-punching, rangefinding, laser radar, phototypesetting, facsimile, electronic mail, barcode reading, annealing, optical inspection, microscopy, photolithography, micro image generation, reconnaissance, optical character recognition, printed circuit board production, halftones and color separations, opthalmology, robotic vision, and quality control benefit from a precise control of the scanning beam.

Of the various types of light, or laser, scanning systems—including the use of polygonal mirrors (called a polygon scanner) or of a disc-shape hologram (called a holographic scanner)—the circuit of the present invention is particularly concerned with the control of a galvanometer-type scanner, and of such scanner type with the self-resonant galvanometer scanner as opposed to the broad band galvanometer scanner. These types of galvanometer scanners offer fundamental advantages of simplicity and freedom from multiple-facet non-uniformity, sometimes called interfacet errors, which are present in other systems. However, driving galvanometer scanners with high accuracy is difficult. The principle errors of the resonant type galvanometer scanner derive from its highly non-linear (sinusoidal) scan function. The circuit of the present invention does not eliminate the sinusoidal scan function of the self-resonant galvanometer scanner, but is concerned with establishing precise repeatability of the optical scanning.

The source of repeatability errors in the scan-to-scan harmonic, or oscillatory, positioning of a light beam responsive to a self-resonant galvanometer scanner is rooted in the fundamental characteristics of such a self-resonant galvanometer scanner. Such self-resonant galvanometer scanners are electronically driven, but have a mechanical resonant frequency,—a high "Q"—similar to a quartz crystal or to a balance wheel on a watch. There is again the very great advantage relative to multi-faceted mirror scanners that only a single mirror is used. In some self-resonant galvanometer scanner systems, the bearing system is actually replaced by a taut band so that, in effect, there are no wearing parts and no variable friction. Because of the high "Q" of a self-resonant galvanometer scanner, and because of the method of mounting the single mirror, a degree of reproducibility in beam trajectory from sweep to sweep (scan to scan) is seemingly possible in a self-resonant galvanometer scanner to a degree which is beyond the capabilities of other types of scanners. Further, the electronic driving system adds only a very slight "push" each cycle, so that the inevitable noise occurring in an electronic drive system causes an effect which is mechanically dampened. For example, if the "Q" is 500, any noise component in the electronic drive signal would be reduced by an approximate factor of 500 to 1 in the effect upon the scanned light beam. Despite this apparent "good news" concerning the reproducibility and accuracy of scanning a light beam by and from a self-resonant galvanometer scanner, the requirements on such a scanner, particularly in the amplitude and centering of the scanned light beam, are even greater than those accuracies and repeatability which are normally present in such a stable, resonant, system.

To understand why the requirements for repeatable and accurate centering and amplitude of the scanned light beam are so great in a self-resonant scanner, consider that the scan trajectory of a light beam deflected by a self-resonant galvanometer scanner is always perfectly sinusoidal. A linear sweep of a light beam with a rapid flyback would be far more desirable. Because of this disadvantage of the sinusoidal scan function exhibited by a self-resonant galvanometer scanner, such scanners have traditionally been used only where great accuracy is not required. For example, in non-impact printing there is a need to place pixels upon the page image with uniform spacing, but the velocity of the light beam swept by a self-resonant galvanometer scanner will typically vary over a two-to-one ratio over the image area of photo conductive drum. To further complicate matters, because the velocity of the beam deflected by a self-resonant galvanometer scanner is varying at such a two-to-one ratio where it contacts the photo conductive drum, if the laser intensity remains uniform than the integrated exposure time of each point upon such drum also varies. This exposure time variation would result in an effective change in the spot diameter across the photo conductive surface, so that the characters would look different dependent upon whether they are the center or at the edge of the page image. The techniques of synchronizing a sinusoidal scanner velocity, and the sinusoidal velocity of the light beam deflected therefrom, to external drive electronics in order to generate a fixed clock to store data into or out of the scanned beam at regular intervals within the image area is beyond the teaching of this patent application. For a reference to prior art techniques, refer to the Article "Linearizing Resident Scanners" appearing in LASERS AND APPLICATIONS for August 1985 at pages 55-59. Reference also U.S. Pat. No. 4,451,061 for Data Clocking Circuitry.

Some of these prior art methods for linearizing a self-resonant galvanometer scanner system embody, as part of such linearization, methods of control of the repeatability in amplitude and centering of the scanner beam. In particular, a grating such as is taught in U.S. Pat. No. 4,212,018 to Ohnishi et al. teaches of employing gratings to generate clocks. The clock so generated is used in control of an analog driver which sets the scanner, which may be a self-resonant galvanometer scanner, into sinusoidal motion at its resonant frequency. Thereafter a feedback derived from the gratings allow maintenance of scanner amplitude, and the grating may also incorporate clear areas near either end in order to define scan limits (the center of the scan beam being midway between the limits). Two prior art methods of digitally linearizing a self-resonant analog scanner also consider the feedback control of the scanner drive. In a first method, the scanner amplitude upon each oscillatory cycle is determined by comparing a previously stored time value with the number of master clock cycles that have occurred between consecutive passages of the scanner beam over a beam sensor, called the Start-of-Scan (SOS) sensor. The result of such comparison is then converted into a voltage by a digital to analog converter, the output of which drives a sample and hold circuit. The value therein derived represents the amplitude error of the scanner, and is summed with the integral of the amplitude error and used to drive the automatic gain control input of the analog controller of such galvanometer scanner. In this manner, amplitude variations of the scanner are held to a fraction of a pixel interval. The scanner operating angle is always held constant by this technique because the master oscillator is phase- and frequency-locked to the scanner.

In a variation of the digital linearization method, a second scan beam detector, called an End-of-Scan (EOS) sensor may be employed. A counter will count at pixel clock speeds proceeding from when the beam crosses the SOS detector until it crosses the EOS detector. A microprocessor will compare the count therein derived with the desired count obtained from a read only memory. Differences relational to the desired versus the actual time of the scanned beam passage over the SOS and EOS sensor are used to set latches which enable a digital to analog converter to fine tune adjustment to the voltage controlled output of a analog controller which drives the galvanometer. Although stabilities of plus or minus one pixel count are seemingly achievable with both digital techniques, and the microprocessor-based calculations allow for correcting of amplitude and frequency drifts in the scanner (eliminating the need for sophisticated analog phaselock control units), extreme high accuracies in pixel positioning call for very high clock rates which may be beyond the reach of transistor-transistor logic. For example, in an application calling for 20,000 pixels placed within an accuracy of 1 part in 200,000 using 80 percent of the scan angle with the scanner running at 200 hertz, a master clock frequency at approximately 136 megahertz is required for the digital method. Further, and more importantly, a stability and repeatability is required of both the digital-to-analog converter and the voltage controlled output analog controller which may not, in fact, be present, especially with temperature variations.

When such sources of error are considered, the prior art methods of digital linearization of a self-resonant galvanometer scanner will accord for some imperfections in repeatability, particularly in the cross-scan direction, resulting from minute differentials of force operating upon the delicate suspension system of a self-resonant galvanometer scanner. These minute differential of force result from a combination of magneto-mechanical and electronic driver system imbalances. If 1200 pixels per inch are to be in placed across an horizontal scan line of greater than 8.5 inches length, then a repeatability to less than 1 part in 10,000 between scans is required even should an error of one entire pixel position be countenanced (the allowable error is normally much smaller, on the order of one tenth of one pixel).

The control of the drive of a self-resonant galvanometer scanner in order that the light, or laser, beam deflected by such self-resonant galvanometer scanner may be repeatably accurately controlled in amplitude and position will, ultimately to the teaching contained herein, be found to be substantially independent of variations in the driver electronics, and in the drive sensitivity of such self-resonant galvanometer scanner, as both such occur with normal variation over time and temperature. The preferred embodiment of the present invention will be able to control a self-resonant galvanometer sensor so that the repeatability in amplitude and centering of a light beam deflected thereby will vary by less than 1 part in 10,000 from scan to scan.

Figure 1B:
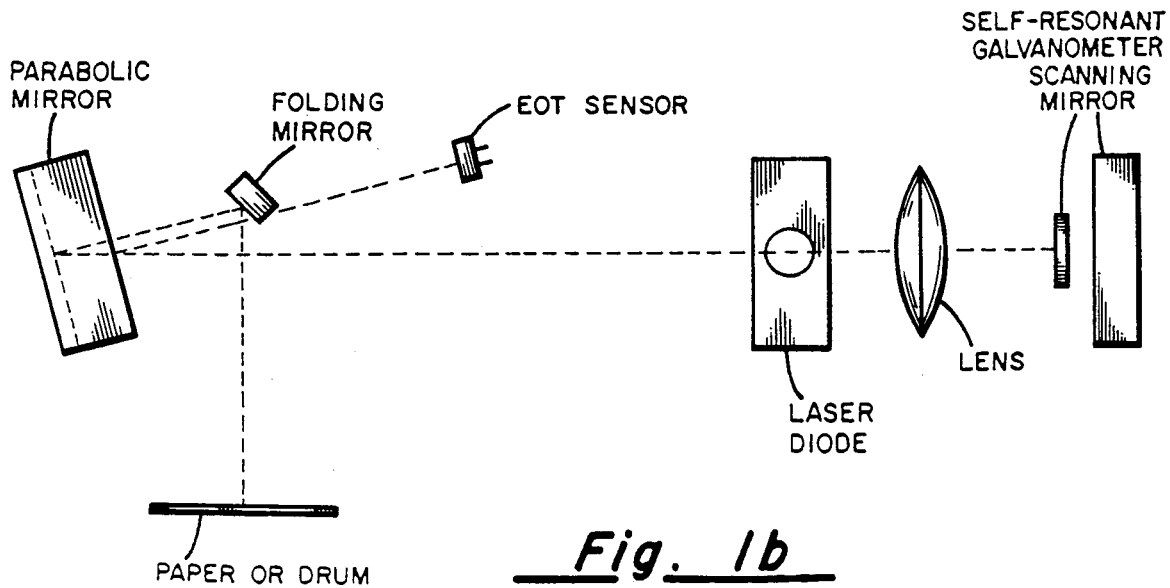

The optical and mechanical layout of a non-impact printer is shown in FIG. 1, consisting of the orthogonal top and side views respectively appearing in FIG. 1a and FIG. 1b. Relatively few components are utilized, keeping cost low. The beam trajectory is illustrated by the dashed lines at various points in time. The points at which the Start-of-Trace (SOT), the Start-of-Scan (SOS) and the End-of-Trace (EOT) sensors might see the beam are illustrated. Each of these sensors is of substantial area. Particularly for the SOT and EOT sensors as are used in the present invention the beam usually does not pass through the entire sensor area. In the diagram of FIG. 1, it might be noted that as the beam approaches the SOT and the EOT sensors, respectively at each end of the scan, the beam is moving but very slowly; hence the amount of energy received by each of the SOT and EOT sensors is an excellent indication of minute variations in scan amplitude. As an alternative to the preferred embodiment implementation of the present invention (as will shortly be discussed in conjunction with FIG. 3), it might have been possible to use the varying amounts of energy received by the SOT sensor and the EOT sensor to control the scan amplitude. However, in the present invention the sensors will be used merely to determine whether the beam has impinged upon such sensors for a sufficient time and to a sufficient degree so as to allow of the receipt of sufficient energy as will allow the setting of a an associated flip-flop; in other words a "detection" that the beam has traversed so far so as to impinge upon such sensor. In fact of actual operation, and although the sensors occupy finite area, it will occur that the light beam, moving but slowly at the ends of the trace, needs impinge upon the sensor for a set distance, and for a corresponding set time, before such sensor will receive sufficient energy so as to allow of a detection. Essentially this means that the EOT and SOT sensors come to demark points, as opposed to finite areas, and will indicate whether the light beam has traversed so far in the respective directions so as to impinge upon such points. For those paths illustrated in FIG. 1, the SOT and the EOT sensors are both illustrated to receive substantial energy from the laser beam. In actual practice of the present invention each such SOT and EOT sensor may or may not intercept the beam on a given sweep to such an extent so as to support of a registered detection. Most desirably, the beam is always just about to intercept each of the SOT and EOT sensors, and will be controlled to constantly traverse to that point, with detections and non-detections occurring intermittently and intermixedly.

Figure 2:
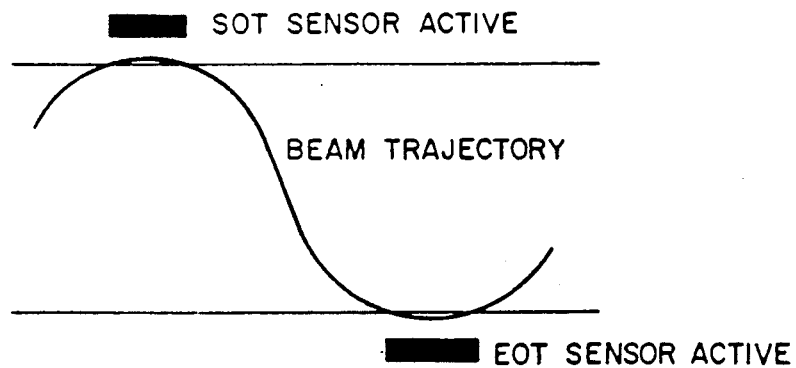
FIG. 2, shows, in a diagrammatic fashion, the beam trajectory of an oscillatory light beam as a function of time, and the duration over which the SOT and EOT sensors might, as an example, see such beam.

This concept of finite sensor area is again illustrated in FIG. 2. In FIG. 2 both the SOT sensor and the EOT sensor are illustrated to receive substantial energy from the laser beam, and are thus referred to as being "active"; meaning that the beam of light has traversed so far in the direction of such sensors so as to impinge upon such sensors to such degree, and for such time, so as to allow of a detection. Again, in the actual practice of the present invention each of the SOT and the EOT sensors may (independently) intercept or not intercept the light beam upon a given sweep.

Figure 3:
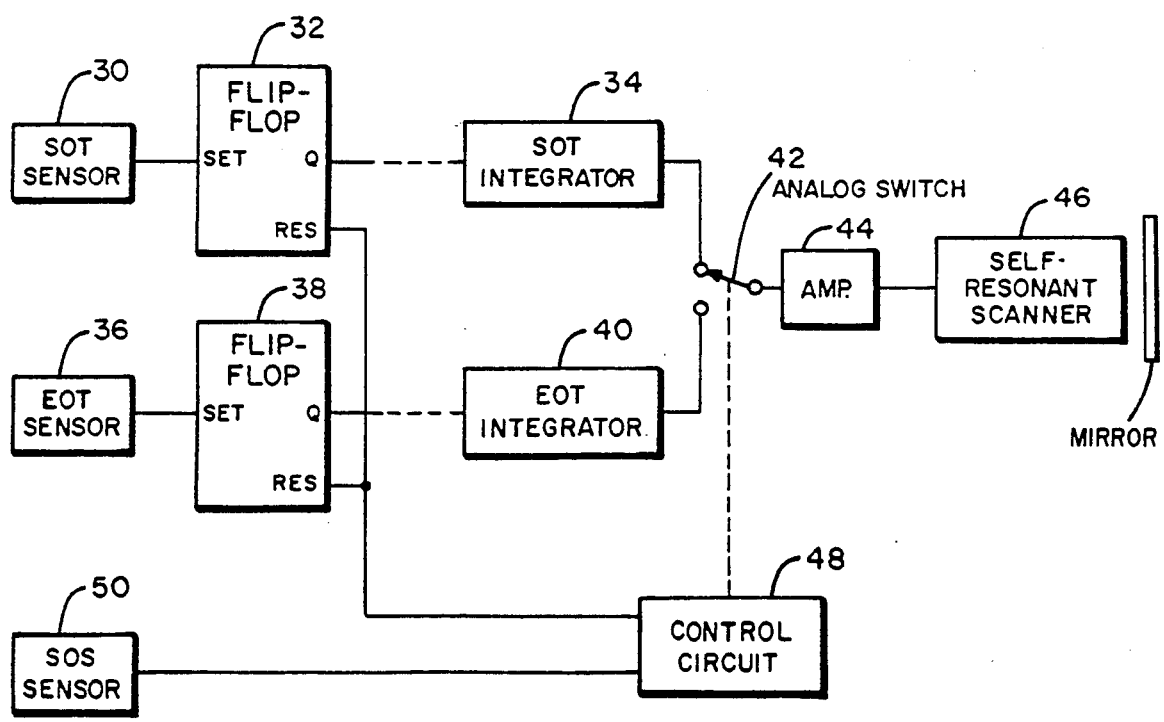
FIG. 3, shows a block diagram of the preferred embodiment of the control circuit of the present invention for the biasing of drive to a self-resonant galvanometer scanner of a light beam.

The block diagram of the circuit of the present invention for controlling drive to a self-resonant galvanometer scanner is shown in FIG. 3. The SOT (Start-of-Trace) sensor will either detect or fail to detect the light beam dependent upon whether the light beam traverses so far in the direction of such SOT sensor so as to provide sufficient energy so that the light beam may be sensed. Likewise, the EOT (End-of-Trace) performs the same function at the opposite end of the scan. The SOS (Start-of-Scan) sensor, which sensor is not part of the present invention, is illustrated in light line in order that correspondence may be registered with FIG. 1, and in order that it may be realized that the SOT sensor and the EOT sensor need not be the only sensors employed in the detection of the position of an oscillatory light beam resultant from a self-resonant galvanometer scanner.

Further in the block diagram of the circuit of the present invention shown in FIG. 3, the SOT FLIP-FLOP 32 will be set by the SOT SENSOR 30, and the EOT FLIP-FLOP 38 will be set by the EOT SENSOR 36, if the corresponding sensor receives more than a certain amount of energy from the light beam during a given sweep. Each of the SOT FLIP-FLOP 32 and the EOT FLIP-FLOP 38 are optional to the present invention; the successive detections, or non-detections, of the light beam resultant respectively from the SOT SENSOR 30 and the EOT SENSOR 36 being essentially gateable directly to the respective SOT INTEGRATOR 34 or the EOT INTEGRATOR 40. The employment of the SOT FLIP-FLOP 32 and of the EOT FLIP-FLOP 38 is useful in that within the preferred embodiment of the present invention it will not be the energy directly from the SOT SENSOR 30, nor from the EOT SENSOR 36, which is integrated within the respective SOT INTEGRATOR 34, or within the EOT INTEGRATOR 40; nor will even that time during which the SOT sensor is active, or the EOT SENSOR 36 is active, be used to control the integration (of power obtained from the circuit of power supply) respectively within the SOT INTEGRATOR 34 or the EOT INTEGRATOR 40. Rather, within the preferred embodiment of the invention that quantity which will be independently integrated in both the SOT INTEGRATOR 34, and within the SOT INTEGRATOR 40, is the power, or energy, derived from the power supply to the present circuit. Such quantity (the energy) will be integrated relative to an integration transfer function which is derived strictly from whether the SOT SENSOR 30 has sensed, or failed to sense, the light beam to an extent which does allow setting of the SOT FLIP-FLOP 32, or, in a parallel and independent manner, that the EOT SENSOR 36 has sensed or failed to sense sufficient light so as to allow setting of the EOT FLIP-FLOP 38. The SOT FLIP-FLOP 32 and the EOT FLIP-FLOP 38, which are respectively set by the SOT SENSOR 30 and the EOT SENSOR 36 and which are cleared by the CONTROL CIRCUITS 48, thusly allow of the storage of the detection or non-detection of the oscillatory light beam by the respective SOT SENSOR 30 or the EOT SENSOR 36 upon the last previous oscillatory cycle. So storing a Binary 1, or a Binary 0, condition, the SOT FLIP-FLOP 32 or the EOT FLIP-FLOP 38 will be controlling of enabling the further integration of energy by the respective SOT INTEGRATOR 34 or by the EOT INTEGRATOR 40 wherein the enablement of such integration upon each cycle will be a function only of whether the oscillatory light beam has been detected to impinge upon the associated sensor. Such cyclic enablement of integration conditional upon the detection of the light beam will not be a function of, nor conditional upon, the energy of such light beam nor of the time duration of such impingement.

The present invention, for which a circuit is shown in block diagram form in FIG. 3 for the preferred embodiment implementation, needs not have (as in the preferred embodiment of the invention) performed integration based upon the binary enablement of a controllable integration transfer function, nor need the present invention have performed integration at all. It may well be envisioned that the times of occurrences that each sensor does set its associated flip-flop might be further used to maintain an incrementing and decrementing counter, with the value of such counter used eventually to develop the drive signal which is applied to the self-resonant galvanometer scanner. In such a method—involving maintaining in a counter of size from 1 to N the numbers of times that previous traverses of the light beam has been so far so as to impinge upon a sensor—it would obviously be that a more ancient occurrence of the traverse of the light beam (within the range of the counter) would be equally weighted as a more recent, and even the most recent, traverse of such light beam. Such equal weighting is not necessarily desirable, it being more important what extent of traverse the light beam did exhibit upon the immediate past cycle than what extent of traverse the light beam did exhibit upon more ancient cycles. Conversely, it is not reasonable to disregard all history of occurrences, at least some numbers those occurrences immediately more recently being experienced being particularly pertinent to the control of the drive signal to the self-resonant galvanometer scanner controlling the deflection of the light beam. Integration, rather than mere accumulation or counting, over time of the successive occurrences of the traverse of the light beam so far as to impinge upon a sensor is obviously the preferred method.

Even when it is recognized that the integration over time of the successive occurrences that a light beam, does, or does not, impinge upon a sensor (in a direction) is recognized to be the superior basis of accumulating information from which a drive signal (in that direction) may be developed, it must be recognized that there are diverse accumulative-type mathematical transfer functions by which such integration may be accomplished. In the first instance, it must be realized that there are alternatives to what should be integrated; (1) the energies detected by the sensor, or (2) some other energies proportionately as the sensors are enabled or disabled, or (3) some other energies strictly if a sensor does perform (or fail to perform) a detection. The present invention chooses the third alternative quantity of integration—the integration of the energy of the power supply to the circuit of the present invention. This integration is strictly enabled (and is thusly proportionately) dependent upon whether a binary 0 or 1 condition has been detected upon each cycle by a light beam impinging upon an associated sensor.

The next thing which must be realized is that the integration will be a function of time. The most recent to the most ancient occurrences can be integrated by many transfer functions: ranging from those that weigh significantly distant occurrences nearly so heavily as the most recent occurrences to those transfer functions which significantly denigrate the contribution of more ancient occurrences relevant to only but a few, or even one, most recent occurrences. The integration transfer function (the integration over time) of the circuit of the present invention will be a combination of transfer functions derived from both hardware and software (meaning firmware). Although a preferred integration time constant, and transfer function, will be apparent within the preferred embodiment circuit implementation of the present invention shown in FIG. 5 and to be discussed in the associated text to this Figure within this specification disclosure, it should be realized that the present invention, in teaching of an integration transfer function partially resident in software (meaning firmware) does accord that such integration function may be fine-tuned to the exhibited response, and environment, of the entire scanner system - most particularly including the self-resonant galvanometer scanner. The method of integration performed by the present invention as represented by SOT INTEGRATOR 34 and EOT INTEGRATOR 40 in FIG. 3 thusly represents not only the preferred, but additionally the tailorable, solution which is generally adjustable to the diverse requirements for drive control of a self-resonant galvanometer scanners of diverse types operating in diverse environments.

Continuing in FIG. 3, the connection between SOT FLIP-FLOP 32 and SOT INTEGRATOR 34, and the connection between EOT FLIP-FLOP 38 and EOT INTEGRATOR 40, are partially shown as dashed lines because the information transfer between such elements will ultimately be through CONTROL CIRCUIT 48, which is a essentially a microprocessor executing firmware microcode. This more detailed paths of the transference of information as to whether the SOT SENSOR 30 did detect the impingement of the oscillatory light beam upon the previous cycle, or whether the EOT SENSOR 36 did detect such impingement, in providing (respectively SOT FLIP-FLOP 32 and EOT FLIP-FLOP 38) input to SOT INTEGRATOR 34 and to EOT INTEGRATOR 40 is not shown in FIG. 3 for the sake of simplicity. The actual path of information transfer may be observed in more detail within the schematic diagram of FIG. 5. In any case, and regardless of the nature of the integration transfer function, it may be generally noted that SOT INTEGRATOR 34 and EOT INTEGRATOR 40 will slowly increase or decrease their outputs depending upon whether respective SOT FLIP-FLOP 32 or EOT FLIP-FLOP 38 are set or reset upon each of repetitive oscillatory cycles.

Continuing in FIG. 3, the CONTROL CIRCUIT 48 receives timing information from the Start-of-Scan SOS SENSOR 50. This CONTROL CIRCUIT 48 has been noted to, amongst other things, to reset the SOT FLIP-FLOP 32 and the EOT FLIP-FLOP 38 at a preset point in each scan cycle. Further, as a function of the timing within the scan cycle, the CONTROL CIRCUIT 48 will operate, at a time nominally halfway within the scan cycle, the ANALOG SWITCH 42 to select the output of either SOT INTEGRATOR 34 or EOT INTEGRATOR 40 to be gated to AMPLIFIER 44. The manner of gating these signals upon a first one-half scan cycle from SOT INTEGRATOR 34, and upon a second one-half scan cycle EOT INTEGRATOR 40, to AMPLIFIER 44 will be such that the amplified drive output of such AMPLIFIER 44 when communicated to SELF-RESONANT SCANNER 46 will be of a polarity during each such first and such second one-half cycle which will serve to maintain such SELF-RESONANT SCANNER 46 in oscillation.

Figure 4:
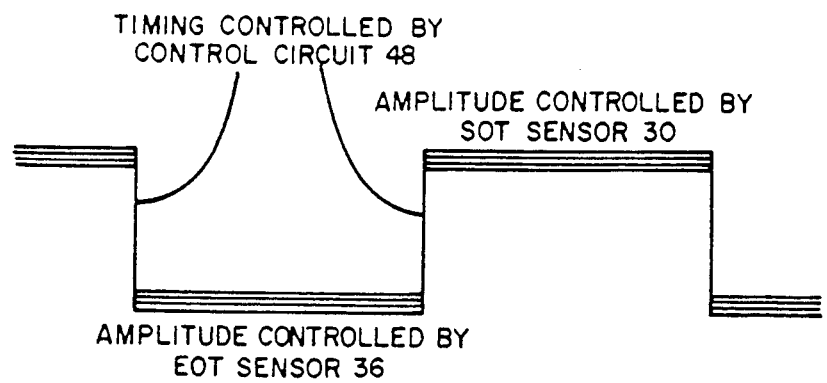
FIG. 4, shows the waveform representative of the signal output of the circuit of the present invention, which signal is sent to the self-resonant galvanometer scanner to control its deflection of a light beam.

The waveform shown in FIG. 4 represents that drive signal which AMPLIFIER 44 does send to SELF-RESONANT SCANNER 46 (shown in FIG. 3). The positive amplitude of such drive signal waveform is controlled by whether or not over the previously integrated number of scan cycles the light beam has intercepted the SOT SENSOR 30 to such an extent as to allow of its detection. The negative amplitude of such drive signal waveform is controlled by whether or not over the previously integrated number of scan cycles the light beam has intercepted the EOT SENSOR 36 so as to allow of its detection. Each of SOT SENSOR 30 and EOT SENSOR 36, and the independent integrations performed relative to the detections of such sensors in respective SOT INTEGRATOR 34 and EOT INTEGRATOR 40 (all shown in FIG. 3), will affect both the amplitude and the centering of the light beam controlled by the SELF-RESONANT SCANNER 46 (shown in FIG. 3). The amplitude, which is shown to be variant in FIG. 4, is controlled by the difference between the two integrator outputs. The centering will be controlled by the sum by the two integrator outputs, that is the sum of that drive occurring by the negative amplitude drive signal which does cause the self-resonant galvanometer scanner to continue oscillation in the direction of the EOT SENSOR 36, and of that drive occurring by the positive amplitude drive signal which does cause the self-resonant galvanometer scanner to continue oscillation in the direction SOT SENSOR 30.

Referencing both FIG. 3 and FIG. 4, the SOT INTEGRATOR 34 and the EOT INTEGRATOR 40 are established in the preferred embodiment implementation of the present invention to each have (independently but equally) a time constant of integration which is very long relative to a single oscillatory cycle. Consequent to these long time constants of integration, the integrators will change their outputs but very slowly relative to the time of such a single oscillatory cycle. Once both the amplitude and the centering of the oscillatory light beam controlled responsively to SELF-RESONANT SCANNER 46 becomes stabilized, the SOT INTEGRATOR 34 and the EOT INTEGRATOR 40 will "hunt" ever so slightly from oscillatory cycle to oscillatory cycle. However, the magnitude of this "hunting" is restricted by the control system, and is made to be inconsequential.

Control systems, based in part upon a firmware implementation of an integration transfer function, can be programmed to increase the rate of change of the integrators when it is sensed (by repetitive sensing of only one condition by either one or both of the BOT and EOT sensors) that the system is running with significant errors. Since it is well known in the electronic arts that sometimes "tight" control is not compatible with a broad span of control, and vice versa, it is notable that the control system of the present invention will be taught to be able to "lock" onto the drive control of a random self-resonant galvanometer scanner initially energized at a random temperature within a wide range of such temperature (thereby making in combination that the applied drive signals may vary over a great range) within but a few hundred oscillatory cycles while thereafter maintaining amplitude and centering control of a light beam scanned responsive to such self-resonant galvanometer scanner with very precise control. The net effect of the direct current bias which appears in the waveform of FIG. 4 (showing the drive signal of the present invention of a self-resonant galvanometer scanner) has but a very small "trimming" effect on the centering of the scanner. However, this small direct bias is effective in correcting for very small, yet important, errors which may have arisen, and which may continue to arise during operation, to mechanical drift and through thermal affects.

Figure 5:
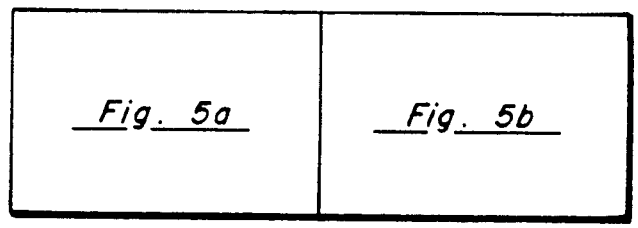
FIG. 5, consisting of FIG. 5A and FIG. 5B, shows the schematic diagram of the preferred embodiment circuit of the present invention for the bias control of drive to a self-resonant galvanometer scanner of a light beam.
Figure 5A:
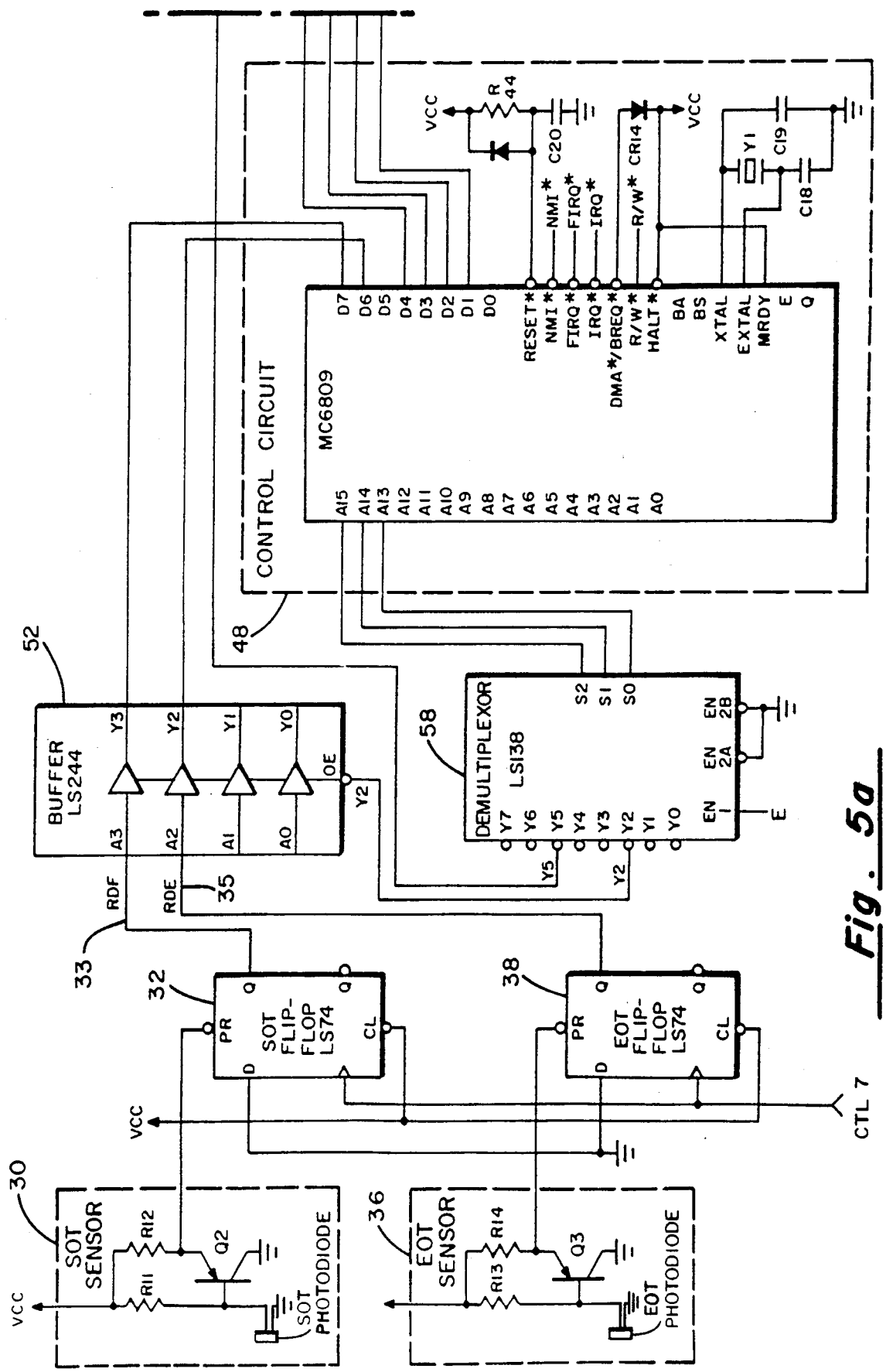
Figure 5B:
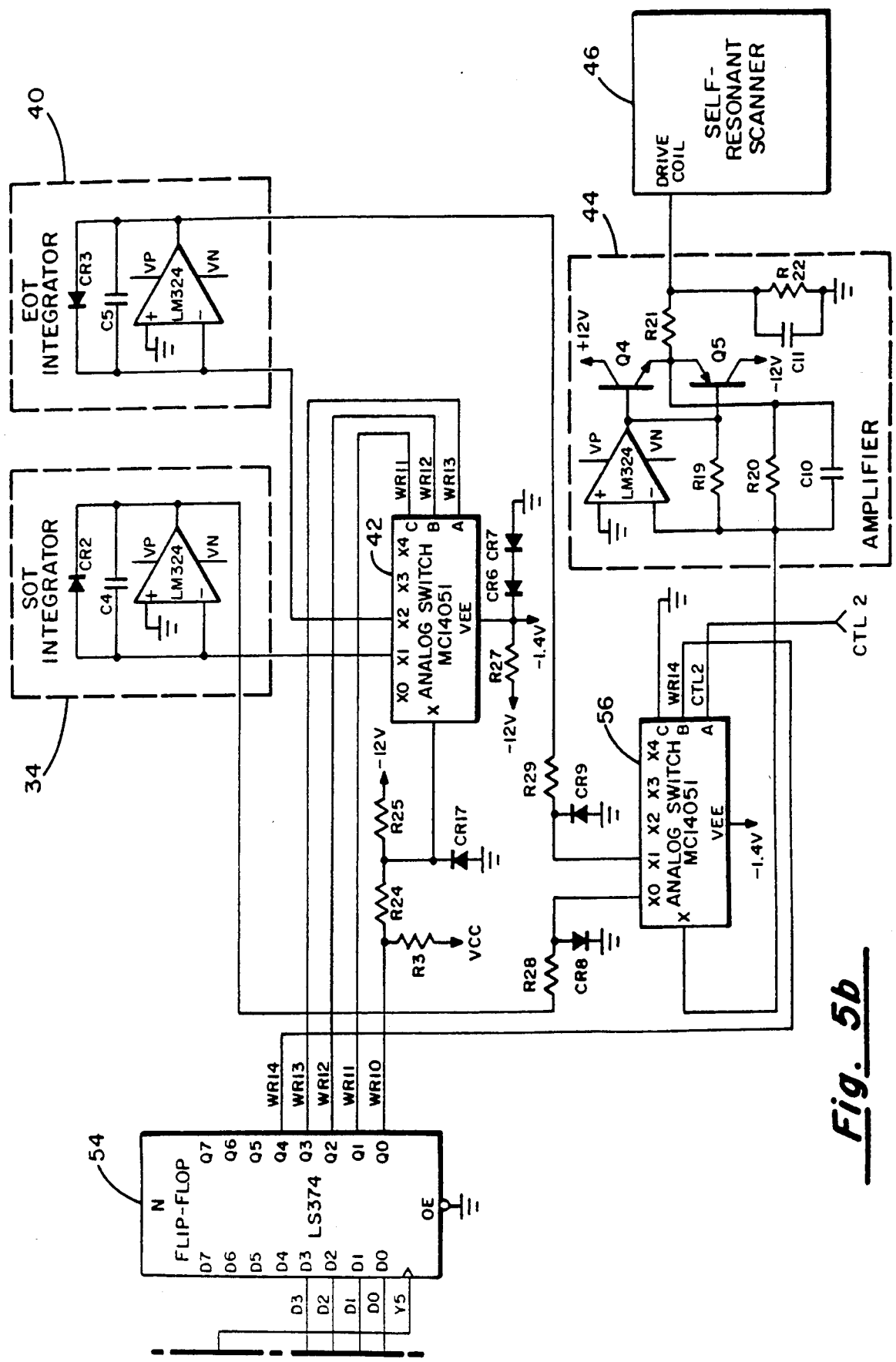

The schematic diagram of the preferred embodiment circuit of the present invention with controlling drive to a self-resonant galvanometer scanner is shown FIG. 5, consisting of FIG. 5a and FIG. 5b. The circuit is generally constructed with transistor-transistor logic, and receives voltage VCC of nominally 5 volts DC, minus 12 volts DC, and ground. The output of SOT SENSOR 30, which contains a Texas Instrument TIL 100 phototransistor, is amplified in the circuit consisting of resistor R11 value 470K ohms, R12 value 18K ohms and PNP Transistor Q2 Type MPS3640 to set the SOT FLIP-FLOP 32 circuit type SN74LS74N Dual D Flip-Flop when the light beam has traversed so far in a first, SOT direction so as to to impinge upon such sensor. Likewise, the output of EOT SENSOR 36, also containing a Texas Instrument type TIL 100 phototransistor, is amplified in the circuit consisting of resistors R13 and R14, respectively 470K ohms and 18K ohms and PNP transistor Q3 Type MPS3640 to set EOT FLIP-FLOP 38 circuit type SN74LS74N upon such time as the oscillatory light beam does traverse so far in a second direction, opposite to the first direction, so as to impinge upon EOT SENSOR 36. The D Type Flip-Flop SOT FLIP-FLOP 32 and the EOT FLIP-FLOP 38 are cleared each cycle by the occurrence of signal CTL7, which is a timing signal the occurrence of which will be shown in FIG. 7. The set side signal output of SOT FLIP-FLOP 32 and of EOT FLIP-FLOP 38 are respectively routed as signals RDE 33 and RDE 35 through non-inverting buffer drivers within BUFFER 52 type SN74LS244N to the CONTROL CIRCUIT 48. The BUFFER 52 is enabled for the passage of such signals by the logical Low occurrence of signal Y2. The signal Y2 is developed in DEMULTIPLEXOR 58 from address lines A15 through A13 which are also received (from the microsequencer of addresses, not shown) at microprocessor MC6809 within CONTROL CIRCUIT 48. Essentially, signal Y2 will decode from the addressing signals as a logical Low level during that portion of microcode execution wherein it is pertinent that the CONTROL CIRCUIT 48 should interrogate, through BUFFER 52, the settings of SOT FLIP-FLOP 32 and EOT FLIP-FLOP 38.

The CONTROL CIRCUIT 48, previously seen in FIG. 3, is seen to consist predominantly of a microprocessor type MC6809. Some of the surrounding circuitry supportive of such microprocessor, such as the clock circuit consisting of 4.0 MHz Crystal Y1 in conjunction with capacitors C19 and C18 each of value 24 picofarads, is shown. Likewise, the bias of the RESET signal input to such microprocessor MC6809 is shown as a circuit consisting of resistor R44 value 10K ohms and capacitor C20 value 33 microfarads. By and large, however, the complete connections to the microprocessor chip MC6809 are not shown, its being understood by a routineer in the digital circuit design art that lines connected to the A0 to A15 signal ports of such microprocessor represent a 16 bit address bus, and the lines connected to the D0 to D7 signal ports of such microprocessor represent an 8 bit data bus; the performance of the microprocessor being to read micro instructions at selective addresses and to perform operations directed thereby, which operations may include either the sensing of, or the setting of, conditions upon the databus.

The particular microcode executed by microprocessor MC6809 within CONTROL CIRCUIT 48 in performance of the present invention is hereinafter next listed as routine CALAMP, meaning that microcode routine which is directed to calibrate scanner amplitude in performance of the present invention. This entire microcode routine is taught in the mnemonic language which will be familiar to users of the MC6809 microprocessor. In interpretation of the microcode received hereinafter listed, it may be immediately noted that it is essentially divided into two equal parts, one part of which is independently concerned with the calibration of scanner drive amplitude dependent upon the Start-of-Trace Sensor, and the second, correspondent, microcode part which is concerned with the calibration of scanner drive amplitude based on the sensing of the End-of-Trace sensor. Interpreting that microcode hereinafter listed, the line wherein the comment "was SOT seen?" appears does test that the SOT FLIP-FLOP 32 be set, or cleared. In the case of the SOT FLIP-FLOP 32 is sensed not to be set, than the line commented that Start-of-Trace is not seen if executed, causing the loading of the immediate quantity 62 hexadecimal, or the binary quantity 0110 0010. The next micro instruction line, commented as "# of adjustments, + amplitude plus direction" does represent the feedback of the number of times that the scanner drive amplitude will be increased, or decreased, relative to the setting of the Start-of-Trace sensor and associated Flip-Flop. The number of adjustments in each direction is noted, so that a determination can be made when the calibration routine is essentially complete. The inner loop executed during that period of time which the flip-flops are connected to the integrators occurs only between the decrement B instruction annotated as "(timing interval) through the first following instruction. In particular, these micro instructions may be observed in the specification for the MC6809 microprocessor to respectively have execution times of approximately 3 microseconds, 3 microseconds, 2 microseconds, 2 microseconds, and 6 microseconds; making for a total execution time of this short, core microcontrol instruction sequence of 16 microseconds. This means that the entire sensing of the flip-flops and the integration performed resultant thereto will transpire within a total minimum time of approximately 16 microseconds.

The control accomplished in this loop, which is quite short, is to be contrasted with the surrounding micro instructions which do establish of the allowable time to reach equilibrium after the circuit is first powered on, which time may be quite long. In particular, when the microcode is first entered after power on, then register B, which will always contain the step size, will have a value equal approximately to 255 decimal. This value will rapidly decrease during operation of the present invention as controlled by the next listed microcode until, when the calibration of the scanner drive amplitude is adjusted to nominal, the value contained within register B will nominally equal 1.

Sample microcode which is executed by the MC6809 microprocessor within CONTROL CIRCUIT 48 and the performance of the present invention is hereinafter this paragraph listed. It may noted, however, that from the discussion already taken, and from the discussion of the principles of operation of the present invention which will be further discussed in this specification disclosure, that the general function of such microcode may be discerned, and that the programming of like or equivalent routine by a routineer in the micro electronic sciences could be expected to be accomplished in management of the same integration function which has been, and which is herein continuing to be, discussed.

A portion of the microprocessor memory map pertinent to the next-listed CALAMP subroutine is as follows:

| | | | |
|---|---|---|---|
| * | *A000 | Outputs | Bit 7: Analog sense drive |
| | | | Bit 6: laser on/off - D |
| | | | Bit 5: laser on/off - clock |
| | | | Bit 4: scanner on/off |
| | | | Bit 3: analog modify select A |
| | | | Bit 2: analog modify select B |
| | | | Bit 1: analog modify select C |
| | | | Bit 0: analog modify up/down |
| * | | | 0 = +, 1 = − |
| | | | More + More − |
| | VCO | X0 | X1 |
| | L100% | X2 | X3 (INV. POL.) |
| | AMPL − | X4 | X5 (INV. POL.) |
| | AMPL + | X8 | X9 |
| | L50% | XC | XD |
| | OFF | XE | XF (X = don't* care) |

Note:
ASDT is 80 or 00, and is not relevant to amplitude calibration.

The listing of the CALAMP subroutine executed by the MC6809 microprocessor is as follows:

| CALAMP | PSHS | B | CALIBRATE SCANNER AMPLITUDE |
|---|---|---|---|
| | TST | SOTOK | Was SOT seen? |
| | BNE | 5$ | |

-continued

|  | LDA | #62 | SOTOK = 00; start of trace not seen. |
| --- | --- | --- | --- |
| * | INC | NAMPLP | # of adjustments, + amplitude, + direction. Knowing # adjustments recently made in each direction tells us when the calibration routine is finished and the system is ready for printing. |
| * |  |  |  |
| * |  |  |  |
|  | BNE | 2$ |  |
|  | DEC | NAMPLP | (max. count = FF) |
| 2$ | ORA | ASDT |  |
|  | STA | 0A000 | (start of adjustment) |
| 3$ | DEC | B | (timing interval) |
|  | BNE | 3$ | loop to generate delay. |
|  | LDA | #6F | (end of adjustment) |
|  | ORA | ASDT | The − amplitude has been trimmed. |
|  | STA | 0A000 |  |
|  | BRA | 10$ |  |
| 5$ | LDA | #63 | SOTOK = nonzero; start of trace* was seen. |
| * |  |  |  |
|  | INC | NAMPLP + 1 |  |
|  | BNE | 2$ |  |
|  | DEC | NAMPLP + 1 | (wraparound from FF to 00 not permitted) |
|  | BRA | 2$ |  |
| 10$ | PULS | B |  |
|  | TST | EOTOK | Was EOT seen? |
|  | BNE | 15$ |  |
|  | LDA | #65 | EOTOK = 00; end of trace not seen. |
| * |  |  |  |
|  | INC | NAMPLM | # of adjustments, + amplitude, + direction. |
| * |  |  |  |
|  | BNE | 12$ |  |
|  | DEC | NAMPLM | (max. count = FF) |
| 12$ | ORA | ASDT |  |
|  | STA | 0A000 | (start of adjustment) |
| 13$ | DEC | B | (timing interval) |
|  | BNE | 13$ |  |
|  | LDA | #6F | (end of adjustment) |
|  | ORA | ASDT | The + amplitude has been trimmed. |
|  | STA | 0A000 |  |
|  | BRA | 20$ |  |
| 15$ | LDA | #64 | EOTOK = nonzero; start of trace was seen. |
| * |  |  |  |
|  | INC | NAMPLM + 1 |  |
|  | BNE | 12$ |  |
|  | DEC | NAMPLM + 1 |  |
|  | BRA | 12$ |  |
| 20$ | RTS |  |  |

Continuing in FIG. 5 the CONTROL CIRCUIT 48 will, responsive to detections of the SOT SENSOR 30 received via SOT FLIP-FLOP 32, and responsive to detections of EOT SENSOR 36 received via EOT FLIP-FLOP 38, control the EOT INTEGRATOR 40 and the SOT INTEGRATOR 34. Particularly CONTROL CIRCUIT 48, acting through microprocessor MC6809, will set signals on the databus output D1 through D3 which will, upon the Low occurrence of enablement signal Y5, be gated to set D FLIP-FLOP 54, type SN74LS374N. The signal Y5 is also developed in DEMULTIPLEXOR 58 from the address lines A15 through A13 like as to the development of signal Y2. Signal Y5 will be Low during such addressed portion of microcode execution as it is pertinent that the CONTROL CIRCUIT 48 should be controlling the ANALOG SWITCH 42 and the ANALOG SWITCH 56. The corresponding three set side signal outputs of such D FLIP-FLOP 54 taken as signals WR11 through WR13 will be used to select ANALOG SWITCH 42, a CMOS data selector type MC14051BCP. Received as the VEE input voltage to such ANALOG SWITCH 42 is a negative voltage of approximately −1.4 volt DC derived from a voltage divider consisting of resistor R27 value 1K ohms in series with diodes CR6 and CR7 each type 1N914B. Received as the X signal input to the ANALOG SWITCH 42 is current of approximately +74 microamps or −74 microamps, depending on WR10, derived from a voltage divider consisting of resistor R24 value 27K ohms, resistor R25 value 120K ohms. The output of SOT INTEGRATOR 34 is positive in voltage. The output of EOT INTEGRATOR 40 is negative in magnitude. When input X to ANALOG SWITCH 42 is negative, such input if selected to the X1 output of ANALOG SWITCH 42 will cause SOT INTEGRATOR 34 to increase in magnitude or, if selected to the X2 output of ANALOG SWITCH 42, will cause EOT INTEGRATOR 40 to decrease in magnitude. Conversely, a positive X input if selected in ANALOG SWITCH 42 to SOT INTEGRATOR 34 will increase the magnitude of such SOT INTEGRATOR 34, or if selected in ANALOG SWITCH 42 to EOT INTEGRATOR 40 will decrease the magnitude of such EOT INTEGRATOR 40. The selection of positive or negative currents at X, directed to either of SOT INTEGRATOR 34, or to EOT INTEGRATOR 40, will be such as to increase the magnitude of the output of the integrator if the corresponding sensor is not seen, and to decrease the magnitude of the output of the integrator if the corresponding sensor is, in fact, seen. The current is enabled by selection signals WR11 through WR13 to be connected to switch output positions X1 or X2. Each selection will transpire, under microprocessor control, to gate appropriate current (respectively that the EOT FLIP-FLOP 38 or the SOT FLIP-FLOP 32 has been determined to be set because of the impinging of the light beam) to the quad FET Operational Amplifiers type LS347AN within the respective EOT INTEGRATOR 40 and SOT INTEGRATOR 34. The EOT INTEGRATOR 40 and the SOT INTEGRATOR 34 will thereby develop a voltage of lessor positive magnitude, essentially meaning "do not drive the beam so far", when each respective sensor is independently impinged upon by the light beam.

Turning next to such EOT INTEGRATOR 40 and to the SOT INTEGRATOR 34, it may be noted that the plus and minus signal inputs to the quad FET Operational Amplifier component type LS347AN are dual fed inputs to capacitors. Meanwhile, the output of such operational amplifiers are used to charge tank circuits respectively consisting of capacitor C4 value 15 microfarads shunted by diodes CR2 type 1N914B, or for the SOT INTEGRATOR 34 the capacitor C5 also of value 15 microfarads likewise shunted by diode CR3 type 1N914B. The net effect of the tank circuits which comprise the EOT INTEGRATOR 40 and SOT INTEGRATOR 34 is that they will change voltage state but extremely slowly in the absence of current drive which is enabled by signals received of ANALOG SWITCH 42. In the absence of such a current drive, the voltage change is primarily determined by the leakage current of the capacitors C4 and C5. The response of the EOT INTEGRATOR 40 and SOT INTEGRATOR 34 form a part of the integration which is controlled by component selection, and which is intentionally established to be, should positive or negative active drive not be received to the contrary, but slowly variant across many oscillatory cycles of the galvanometer scanner.

Continuing in FIG. 5, ANALOG SWITCH 56, also a CMOS data selector type MC14051BCP, does under the control of signal WR14 arising from the CONTROL CIRCUIT 48 in conjunction with timing signal CTL2 select upon a first half cycle the output of SOT INTEGRATOR 34, and upon a second half cycle the output of EOT INTEGRATOR 40, to be applied to AMPLIFIER 44. It may be further noted that the voltages developed in SOT INTEGRATOR 34 and EOT INTEGRATOR 40 are current limited within the application to ANALOG SWITCH 56 by respective resistors R28 and R29, value 10K ohms, and by diodes CR8 and CR9, type 1N914B. The timing of the switching within ANALOG SWITCH 56, obtained under the control of signal CTL2, between gating the output of SOT INTEGRATOR 34, or the output of EOT INTEGRATOR 40 to AMPLIFIER 44 will be set for a certain phase relationship depending upon the time since the last Start-of-Scan (SOS) pulse (detection) was seen and the time remaining until the next one should be seen. It was for this reason that SOS SENSOR 50 was shown to be an input to CONTROL CIRCUIT 48 within the block diagram of FIG. 3. It will be later be shown, in conjunction with the timing diagram of FIG. 7 wherein the timing of signal CTL2 is shown, however, that the operation of the present invention will proceed even should such timing signals CTL2 not suffice to precisely control ANALOG SWITCH 56 and the gating performed therein so that the drive to the self-resonant galvanometer scanner will be switched precisely at the midpoint of the scan.

In any case to the switching of the drive from that level maintained by the SOT INTEGRATOR 34 to that independent level maintained EOT INTEGRATOR 40 approximately at the midpoint of the scan in ANALOG SWITCH 56, the AMPLIFIER 44 will amplify each such level received for application to the drive coil of the SELF-RESONANT SCANNER 46. The AMPLIFIER 44 is seen to consist of an FET operational amplifier type LF347AN in conjunction with Resistor R19 value 1 megaohm, R20 value 10K ohms, capacitor C10 value 0.001 microfarads, and a push-pull output stage configured as NPN transistor Q4 type MPSA05 and PNP transistor Q5 type MPSA55. The current drive to the DRIVE COIL of SELF-RESONANT SCANNER 46 is further divided in a resistive divider consisting of resistors R21 value 22 ohms (1 half watt) and R22 value 1K ohms wherein R22 is shunted by capacitor C11 value 0.001 microfarad. The net effect of circuit operation is to apply to the DRIVE COIL of the SELF-RESONANT SCANNER 46 the waveform previously seen in FIG. 4.

It may be noted in FIG. 5a that timing signal CTL7 serves when Low to reset SOT FLIP-FLOP 32 and EOT FLIP-FLOP 38, and in FIG. 5b that timing signal CTL2 serves to enable the selection of ANALOG SWITCH 56 (along with signal WR14 arising indirctly from the CONTROL CIRCUIT 48) to select the gating of either the voltage level from the electrical tank circuit SOT INTEGRATOR 34, or the voltage level from the electrical tank circuit EOT INTEGRATOR 40, to the AMPLIFIER 44. The timing signals CTL2 and CTL7 are respectively shown in FIGS. 6c and 6d. In order that it may be generally perceived how such timing signals relate to the oscillatory light beam, and how such might be routinely generated, the transient pulse resultant from the (always) actuation of the SOS SENSOR 50 (shown in FIGS. 1 and 2) is shown in FIG. 6a. Such SOS TRANSITION pulse is used to actuate a timing chain, or PULSE GENERATOR (not shown) which will produce the general timing chain shown in FIG. 6b. From such timing chain it is possible to fix the times, relative to the SOS TRANSITION, of bothe CTL2 and CTL7.

The precision of timing pulse CTL7 shown in FIG. 6d and in FIG. 5a, is used as it is merely to clear the sensor flip-flops once each cycle, not especially critical. But by observation in FIG. 5b of the use of timing waveform CTL2, the nominal occurrence of which is shown in FIG. 6d, it will immediately be recognized that this waveform does control that the self-resonant galvanometer should be driven, in a reinforcing manner, during each of two halves of the oscillatory cycle. These halves are preferably exactly one-half, or 180 degrees, of the time between successive sensings of the SOT SENSOR 30, or of the EOT SENSOR 36 (shown in FIGS. 1, 2, and 5). Compare to the pendulum on a clock: it is desired to push the pendulum in one direction for exactly one-half of each oscillatory cycle, and in the other direction for the other half of each oscillatory cycle. But what happens if the timing is not perfect, as is inevitably the case? Basically this means that self-resonant galvanometer drive might be, if only for an instant near the end of the arc of oscillation, in a direction, or sense, contrary to the physical motion of the galvanometer. This is undesirable. Even with the high "Q" of the self-resonant galvanometer, it is not good to drive counter to motion. It is as if a pendulum on a clock were to undergo a shudder from a physical impulse contrary to normal motion. Remember, it is desirable to control the amplitude and centering of the self-resonant galvanometer scanner of a light beam simultaneous that the oscillation of such self-resonant galvanometer should be extremely smooth and noiseless in order that the positional accuracy of a light beam deflected therefrom may be, when determined in time (such as to gate such light beam in order to write a pixel) of greatest precision in space (the location along the oscillatory beam path where such pixel will be written or read).

The performance of the circuit of the present invention in the face of imperfect halving of the oscillatory cycle, meaning imperfect generation and/or phasing of timing pulse CTL2, is shown in FIG. 7. The illustration of FIG. 7a is that when inaccuracy, or noise, attends the precise location of the midpoint, or 180 degree point, of each oscillatory cycle then error in the galvanometer deflection will occur, dispite the present invention. How will the circuit of the present invention respond in the event of such noise? Consider an extreme timing distortion, not to be encountered in actual circuit application, shown in FIG. 7b purely for the purposes of illustration. It is suggested in FIG. 7b that timing signal CTL2 will imperfectly change at 170 degrees within the oscillatory cycle instead of at 180 degrees. The short, 170 degrees, period of galvanometer drive will, by action of the circuit of the present invention come to be at a higher amplitude than the galvanometer drive during the remaining 190 degree period of each oscillatory cycle—reference FIG. 4. But there will be error in the galvanometer deflection. Therefore the transition of CTL2 should be tightly controlled.

The additional teaching of FIG. 7b, showing the undesirable perturbation of self-resonant galvanometer drive and resultant motion (which is desired to be perfectly sinusoidal) when the drive waveform is temporally varied, is that such temporal variation in drive current application is exactly the way the prior art control circuits discussed in the Background of the Invention Section function! The present invention—varying the amplitude of each one-half of the self-resonant scanner drive waveform (while attempting in accordance with the constant timing of CTL2 to hold the phase of the application of drive in each direction to exactly 180 degrees of the oscillatory cycle)—should be compared to such prior art methods temporally varying the period, or phase, of the applied waveform. The method of the present invention better achieves that the motion of the self-resonant galvanometer scanner, and of any light beam deflected thereby, should be and be maintained precisely sinusoidal without induced perturbation.

In summary, the present invention serves to (1) insure that the amplitude of the self-resonant scanner is always the intended amplitude irrespective of electronic and/or mechanical changes, and (2) insure that the centering of the self-resonant scanner is always precisely midway between the two outside sensors (the SOT sensor and the EOT sensor) also irrespective of any electronic and/or mechanical changes. Because of that stability in amplitude and centering of a self-resonant galvanometer scanner, and of any light beam deflected therefrom, accorded by the present invention, the mechanical position of the scanner, and of the deflected light beam, may be inferred, based on a (correctly) assumed sinusoidal behavior, with great precision. It is precision in this mechanical positional inference which is of great value to printing with high resolution and precision. In operation of the present invention, when the Start-of Scan (SOS) signal is seen then the precise phase angle of the scanner is known at that point. If the amplitude and/or the centering of the self-resonant galvanometer scanner was even slightly in error, then this would not be the case. These attributes of the present invention should be compared to prior art circuits discussed in the background of the invention section, which prior art circuits gain spacial (mechanical) precision in the positional control of a light beam deflected from a self-resonant galvanometer scanner only through extreme temporal precision in the control of drive to such self-resonant galvanometer.

Once the principles of the present invention to (1) accumulate, and preferably integrate, the historical detections of an impinging light beam upon each of two opposed sensors, to (2) develop a variable drive voltage responsive to each such accumulation, and to (3) apply such variable drive voltages each to drive a self-resonant galvanometer scanner during one-half of its oscillatory cycle, are recognized to beneficently effect the amplitude and centering control of a light beam deflected by such self-resonant galvanometer scanner, then certain alterations in the circuit and method of the present invention will present themselves to a routineer in the circuit design arts. Further, the present invention allows that the time constant(s) of integration should be selectably predetermined, which supports of the adaptation of the method and apparatus of the present invention to diverse galvanometer types and applications. Therefore the following claims should be interpreted broadly, in accordance with the character of the invention.

What is claimed is:

1. A circuit apparatus for controlling drive to a self-resonant scanner of a light beam, said apparatus comprising:

a Start-of-Trace sensor for detecting all times that a light beam which is repetitively, time-after-time, tracing an oscillatory course responsive to a self-resonant scanner of said light beam, does traverse so far in a first direction of excursion so as to impinge upon a first, start-of-trace, fixed point along said first direction of excursion;

an End-of-Trace sensor for detecting all times that said light beam which is repetitively, time-after-time, tracing said oscillatory course responsive to said self-resonant scanner of said light beam, does traverse so far in a second direction of excursion, opposite to said first direction of excursion, so as to impinge upon a second, end-of-trace, fixed point along said second direction of excursion;

Start-of-Trace accumulating means responsive to said detecting of said Start-of-Trace sensor for producing a first voltage level proportional to the numbers of times said light beam did traverse so far in said first direction of excursion so as to be detected by said Start-of-Trace sensor to impinge upon said first, start-of-trace, fixed point;

End-of-Trace accumulating means responsive to said End-of-Trace sensor for producing a second voltage level proportional to the numbers of times said light beam did traverse so far in said second direction of excursion so as to be detected by said End-of-Trace sensor to impinge upon said second, end-of-trace, fixed point;

driver means responsive to a received signal for providing drive to said self-resonant scanner of said light beam; and coupling means for coupling during a first one-half of each oscillatory cycle said first voltage level received of said Start-of-Trace accumulating means to said drive means at a polarity which will cause said driver means to provide a drive inducing said self-resonant scanner of a light beam to continue in oscillation, and for coupling during a second one-half of each oscillatory cycle said second voltage level received of said End-of-Trace accumulating means to said drive means at a polarity which will cause said drive means to provide a drive inducing said self-resonant scanner of a light beam to continue in oscillation.

2. The circuit apparatus for controlling drive to a self-resonant scanner of a light beam of claim 1 wherein said Start-of-Trace accumulating means further comprises:

Start-of-Trace integrating accumulating means for—in producing said first voltage level proportional to the numbers of times said light beam did traverse so far in said first direction of excursion so as to be detected by said Start-of-Trace sensor to impinge upon said first, start-of-trace, fixed point—integrating the accumulation of all said times of occurrences so that most recent times of occurrences are weighted proportionately more heavily in said producing than more ancient times of occurrences; and wherein said End-of-Trace accumulating means further comprises:

End-of-Trace integrating accumulating means for—in producing said second voltage level proportional to the numbers of times said light beam did traverse so far in said second direction of excursion so as to be detected by said End-of-Trace sensor to impinge upon said second, end-of-trace, fixed point—integrating the accumulation of all said times of occurrences so that most recent times of occurrences are weighted proportionately more heavily in said producing than more ancient times of occurrences.

3. The circuit apparatus for controlling drive to a self-resonant scanner of a light beam of claim 2 wherein said Start-of-Trace integrating accumulating means further comprises:
Start-of-Trace integrating accumulating means for performing integration at an integration time constant which is selectably predetermined;
and wherein said End-of-Trace integrating accumulating means further comprises:
End-of-Trace integrating accumulating means for performing integration at an integration time constant which is selectably predetermined.

4. The circuit apparatus for controlling drive to a self-resonant scanner of a light beam of claim 3 wherein said Start-of-Trace integrating accumulating means further comprises:
Start-of-Trace integrating accumulating means for performing integration at an integration time constant which is long relative to any one oscillatory cycle of said light beam and relative to any one time of occurrence;
and wherein said End-of-Trace integrating accumulating means further comprises:
End-of-Trace integrating accumulating means for performing integration at an integration time constant which is long relative to any one oscillatory cycle of said light beam and relative to any one time of occurrence.

5. The circuit apparatus for controlling drive to a self-resonant scanner of a light beam of claim 1 wherein said Start-of-Trace accumulating means further comprises:
Start-of-Trace accumulating means for—in producing said first voltage level proportional to the numbers of times said light beam did traverse so far in said first direction of excursion so as to be detected by said Start-of-Trace sensor to impinge upon said first, start-of-trace, fixed point—making an analog accumulation of voltage charge in a first electrical tank circuit, the accumulated voltage charge of said first electrical tank circuit being said first voltage level; and
wherein said End-of-Trace accumulating means further comprises:
End-of-Trace integrating accumulating means for—in producing said second voltage level proportional to the numbers of times said light beam did traverse so far in said second direction of excursion so as to be detected by said End-of-Trace sensor to impinge upon said second, end-of-trace, fixed point—making an analog accumulation of voltage charge in a second electrical tank circuit, the accumulated voltage charge of said second electrical tank circuit being said second voltage level.

6. The circuit apparatus for controlling drive to a self-resonant scanner of a light beam of claim 5 wherein said Start-of-Trace accumulating means further comprises:
Start-of-Trace accumulating means for making said analog accumulation of voltage charge in said first electrical tank circuit
by adding a small amount of positive voltage charge upon each oscillatory cycle of said light beam that said light beam does not traverse so far in said first direction of excursion as said first, start-of-trace, point and is thusly not detected by said Start-of-Trace sensor to impinge upon said first, start-of-trace, point, and
by adding a small amount of negative voltage charge upon each oscillatory cycle of said light beam that said light beam does traverse so far in said first direction of excursion as said first, start-of-trace, point and is thusly detected by said Start-of-Trace sensor to impinge upon said first, start-of-trace, point,
thereby said voltage charge of said first electrical tank circuit being said first voltage level is increased in positive magnitude when said light beam does not, and decreased in positive magnitude when said light beam does, traverse so far in said first direction upon each oscillatory cycle of said light beam so as to impinge upon said first, start-of-trace, point; and
wherein said End-of-Trace accumulating means further comprises:
End-of-Trace accumulating means for making said analog accumulation of voltage charge, opposite in polarity to the voltage charge accumulated in said Start-of-Trace accumulating means, in said second electrical tank circuit
by adding a small amount of negative voltage charge upon each oscillatory cycle of said light beam that said light beam does not traverse so far in said second direction of excursion as said second, end-of-trace, point and is thusly not detected by said End-of-Trace sensor to impinge upon said second, end-of-trace, point, and
by adding a small amount of positive voltage charge upon each oscillatory cycle of said light beam that said light beam does traverse so far in said second direction of excursion as said second, end-of-trace, point and is thusly detected by said End-of-Trace sensor to impinge upon said second, end-of-trace, point,
thereby said voltage charge of said first electrical tank circuit being said second voltage level is increased in negative magnitude when said light beam does not, and decreased in negative magnitude when said light beam does, traverse so far in said first direction upon each oscillatory cycle of said light beam so as to impinge upon said second, end-of-trace point.

7. A circuit apparatus for controlling drive to a self-resonant scanner of a light beam, said apparatus comprising:
Start-of-Trace sensor means for detecting all times of first-type occurrences that a light beam tracing an oscillatory course responsive to a self-resonant scanner of such said light beam does traverse so far in a first direction of said oscillatory course so as to impinge upon a first point, called a start-of-trace point;
first-polarity first-variable-voltage drive means responsive to said Start-of-Trace sensor means for driving a self-resonant scanner of a light beam
during a first one-half of Beginning-of-Trace to End-of-Trace oscillatory cycle
at a first polarity causative that said self-resonant scanner of a light beam should continue in oscillation
at a variable first voltage derived proportionately to the numbers of times of said first-type occurrences detected by said Start-of-Trace sensor means relative to the total number of times of all oscillations of said light beam;

End-of-Trace sensor means for detecting all times of second-type occurrences that a light beam tracing an oscillatory course responsive to a self-resonant scanner of such said light beam does traverse so far in a second direction of said oscillatory course so as to impinge upon a second point, called a end-of-trace point;

second-polarity second-variable-voltage drive means responsive to said End-of-Trace sensor means for driving a self-resonant scanner of a light beam during a second one-half of Beginning-of-Trace to End-of-Trace oscillatory cycle at a second polarity causative that said self-resonant scanner of a light beam should continue in oscillation at a variable second voltage derived proportionately to the numbers of times of said second-type occurrences detected by said End-of-Trace sensor means relative to the total number of times of all oscillations of said light beam.

8. The circuit apparatus for controlling drive to a self-resonant scanner of a light beam of claim 7 wherein said first-polarity first-variable-voltage drive means further comprises:

first-polarity first-variable-voltage drive means for driving the self-resonant scanner of a light beam at a first variable voltage derived proportionately to the integration of the numbers of times of said first-type occurrences detected by said Start-of-Trace sensor means relative to the total number of times of all oscillations of said light beam; and wherein said second-polarity second-variable-voltage drive means further comprises:

second-polarity second-variable-voltage drive means for driving the self-resonant scanner of a light beam at a second variable voltage derived proportionately to the integration of the numbers of times of said second-type occurrences detected by said End-of-Trace sensor means relative to the total number of times of all oscillations of said light beam.

9. The circuit apparatus for controlling drive to a self-resonant scanner of a light beam of claim 8 wherein said first-polarity first-variable-voltage drive means further comprises:

first-polarity first-variable-voltage drive means for decreasing said first variable voltage upon each time that said Start-of-Trace means does detect said first-type occurrence, and for increasing said first variable voltage upon each oscillation of said light beam wherein said Start-of-Trace means does not detect said first-type occurrence; and wherein said second-polarity second-variable-voltage drive means further comprises:

second-polarity second-variable-voltage drive means for decreasing said second variable voltage upon each time that said End-of-Trace means does detect said second-type occurrence, and for increasing said second variable voltage upon each oscillation of said light beam wherein said End-of-Trace means does not detect said second-type occurrence.

10. A method for controlling the amplitude and centering of an oscillatory light beam directed by a self-resonant scanner, said method comprising:

first detecting, in first sensor circuitry, all times of a first-type occurrence that an oscillatory light beam positionally directed by a self-resonant scanner of such light beam does traverse so far as a first fixed point in a first direction of oscillatory excursion;

first accumulating, in first-accumulating circuitry, the numbers of said first-type occurrences in order to produce a first voltage level proportional to the numbers and times of said first-type occurrences;

first coupling, in coupling and amplifying circuitry, said first voltage level amplified to drive said self-resonant scanner during that one-half of each oscillatory cycle during which said light beam is caused to traverse in a second direction of excursion, said amplified drive being in a direction to reinforce said oscillation;

second detecting, in second sensor circuitry, all times of a second-type occurrence that an oscillatory light beam positionally directed by a self-resonant scanner of such light beam does traverse so far as a second fixed point in said second direction of oscillatory excursion;

second accumulating, in second-accumulating circuitry, the numbers of said second-type occurrences in order to produce a second voltage level proportional to the numbers and times of said second-type occurrences;

second coupling, in coupling and amplifying circuitry, said second voltage level amplified to drive said self-resonant scanner during that one-half of each oscillatory cycle during which said light beam is caused to traverse in said first direction of excursion, said amplified drive being in a direction to reinforce said oscillation;

wherein the greater the numbers of said first-type occurrences causes the lesser said drive of said self-resonant scanner in said first direction of oscillatory excursion, while the greater the numbers of said second-type occurrences causes the lesser said drive of said self-resonant scanner in said second direction of excursion;

wherein the combined effect of first detecting, first accumulating, first coupling, second detecting, second accumulating, and second coupling will tend to create an amplitude of oscillatory excursion which is from said first fixed point to said second fixed point, with the center in space of said oscillatory excursion being at the midpoint between said first fixed point and said second fixed point, with the center in time of said oscillatory excursion being midtime between the time of closest proximity of said oscillatory light beam to said first point and the time of closest proximity of said oscillatory light beam to said second point, said midtime being equivalent to that time whereupon the oscillatory light beam is in closest proximity to said midpoint.

* * * * *